(12) United States Patent
O'Donoghue et al.

(10) Patent No.: US 8,764,503 B2
(45) Date of Patent: Jul. 1, 2014

(54) SYSTEM AND METHOD FOR REMOVAL OF HAZARDOUS SUBSTANCES FROM LIQUID CRYSTAL DISPLAYS

(75) Inventors: Lisa O'Donoghue, Limerick (IE); Huw Lewis, Castletroy (IE); Alan Ryan, Nenagh (IE)

(73) Assignee: University of Limerick, Limerick (IE)

( * ) Notice: Subject to any disclaimer, the term of this patent is extended or adjusted under 35 U.S.C. 154(b) by 184 days.

(21) Appl. No.: 13/516,716

(22) PCT Filed: Dec. 16, 2010

(86) PCT No.: PCT/IE2010/000072
§ 371 (c)(1),
(2), (4) Date: Oct. 25, 2012

(87) PCT Pub. No.: WO2011/073966
PCT Pub. Date: Jun. 23, 2011

(65) Prior Publication Data
US 2013/0035016 A1      Feb. 7, 2013

(30) Foreign Application Priority Data

Dec. 16, 2009   (IE) .................................... 2009/0943

(51) Int. Cl.
*H01J 9/50*      (2006.01)

(52) U.S. Cl.
USPC ................................................. 445/2; 445/1

(58) Field of Classification Search
CPC . C08L 2666/02; C08L 2666/24; C08L 53/02; C08L 53/025; G02F 1/133308; G02F 1/133753

USPC .......................................................... 445/1–2
See application file for complete search history.

(56) References Cited

U.S. PATENT DOCUMENTS

| | | | |
|---|---|---|---|
| 5,890,940 A * | 4/1999 | Rozema et al. | 445/2 |
| 6,632,113 B1 * | 10/2003 | Noma et al. | 445/2 |
| 2004/0002276 A1 | 1/2004 | Noma et al. | |
| 2010/0062673 A1 * | 3/2010 | Tedjar et al. | 445/2 |
| 2012/0011966 A1 * | 1/2012 | Martin | 75/626 |

FOREIGN PATENT DOCUMENTS

| | | |
|---|---|---|
| DE | 4330184 | 3/1995 |
| DE | 102007018954 | 10/2007 |
| JP | 9115445 | 5/1997 |
| JP | 2009113871 | 5/2009 |

* cited by examiner

*Primary Examiner* — Anne Hines
(74) *Attorney, Agent, or Firm* — Patrick J. S. Inouye; Krista A. Wittman

(57) ABSTRACT

A process for removing hazardous substances from a LCD display (1) includes incision through off set lines (10) around the front of the panel (3). Top components are then removed to expose the fluorescent tubes (5) which contain hazardous substances. The incisions are parallel to the recessed lips, at a distance in the range of 0 to 20 mm from the recessed lips. The cuts are to a depth of 20 mm to 50 mm. Preferably, at least two incisions are made simultaneously. The fluorescent tubes (5) are crushed after the access operation, by rollers, chains or by plates. During crushing there is suction of the particles and gases which are released, thereby removing the hazardous substances by filtration.

20 Claims, 8 Drawing Sheets

SYSTEM AND METHOD FOR REMOVAL OF HAZARDOUS SUBSTANCES FROM LIQUID CRYSTAL DISPLAYS

CROSS-REFERENCE TO RELATED APPLICATIONS

This patent application is the U.S. National Phase patent application under 35 U.S.C. §371 of International Application No. PCT/IE2010/000072, filed on Dec. 16, 2010, which in turn claims the benefit of Irish Patent Application No. IE 2009/0943, filed on Dec. 16, 2009, the disclosures of which are incorporated by reference herein.

INTRODUCTION

1. Field of the Invention

The invention relates to removal of hazardous substances from flat screen liquid crystal displays ("LCDs").

2. Prior Art Discussion

LCDs typically comprise a liquid crystal panel, a metal frame, filter sheets, cold cathode fluorescent tubes (CCFTs) which contain mercury, printed circuit boards, mounting frames, backlighting frame (which may consist of aluminium or steel), and a plastics casing.

The typical, end of life disposal method for waste electronic and electrical equipment (WEEE) is land fill or incineration, and problems are associated with both types. Both are expensive and cause potential emissions into the atmosphere (global warming), water contamination, and/or difficulties in biodegradation.

The waste disposal of LCDs is particularly problematic as they contain the very hazardous substance mercury in the backlighting device. LCDs may also contain other potentially hazardous substances such as liquid crystals (which are currently under toxicity investigation) and plastics which may contain toxic fire retardant additives, and printed circuit boards which may contain lead.

Therefore, the traditional disposal methods are not suitable for handling waste LCDs. For example, incineration of LCD components such as liquid crystal may produce emissions of toxins such as dioxins and furans, depending on the type of compound and the level or type of flame retardant present. On the other hand the environmental impact of land-filling waste LCDs, is potential seepage of the hazardous substances into the soil.

The European Commission has requested the separation of waste LCD panels with an area greater than 100 cm$^2$ in the Directive 2002/96/EC of the European Parliament and of the Council on Waste Electrical and Electronic Equipment (WEEE Directive) of Feb. 13, 2003. This directive particularly calls for the removal of mercury-containing substances, preparations and components from WEEE waste components, such as switches or backlighting lamps.

Under these circumstances, conventional processing methods must be reconsidered. Shredding of LCDs has proved to be ineffective as the LCD contains mercury which will contaminate the shred waste stream. Shredding processes also reduce the quality of the materials being recovered and hence the value of the waste streams. Research has shown that it is not practical to recover the total mercury from the shredded debris (Demonstration of Flat Panel Display recycling technologies, Project code: MDD014, Final report on the demonstration trials into Flat Panel Display recycling technologies, 2009 Date: September 2010, Published by WRAP—Waste and Resource Action Program, UK)

Incineration has associated problems including potential incineration of liquid crystal which may contain chlorine, creating dioxins and furans, production of ash which subsequently needs to be land-filled, and loss of materials with potential market value. Pyrometallurgical and smelting operations are not recommended to process the entire LCD as only the metal content is recycled and the remainder is land-filled.

Manual disassembly is a slow and labour-intensive process as it involves dismantling and segregating plastics covers, PCBs, cables, speakers, and mounting frame, disassembly of the light box unit, glass, diffuser sheets, and perplex block, and finally disassembly and segregation of fluorescent tubes. Special care must be taken to ensure that workers are not exposed to the mercury and this is extremely difficult to achieve as the fluorescent tubes must be removed by hand.

Fully automated disassembly using robotics is an extremely expensive option, requiring complex and highly configurable robotics.

CN101209453A discloses a method for disassembly of LCD displays by cutting the sides of the LCD at the assembly part of the LCD display. This method separates the LCD into two fractions; namely what is referred to as the glass of the LCD panel and what is referred to as the backlight template of the panel (which includes the aluminium/iron shell, fluorescent tubes and filter sheets). However, further disassembly and removal of the fluorescent tubes from the backlight template requires manual disassembly.

Another method for disassembling flat panel displays (FPD) is disclosed in US 2004/0002276 A1, which describes cutting part of the face plate and the rear plate to separate a portion of the frame joined with frit glass from the remaining portions. These types of displays are typically 'plasma displays', 'vacuum fluorescent displays', 'surface conducting type electron source displays', 'field emission electron source displays' and they contain a significant portion of 'leaded glass' which is considered hazardous and must be removed for the displays. It appears that the methods described in this specification would not be suitable for removing the hazardous materials from an LCD display.

A method for separation of front and rear surfaces of a first mother substrate made of a brittle material is disclosed in US 2004/0040997 A1. This disclosure is concerned with the post-breakdown of the glass panel by cutting the brittle materials, and by scribing and breaking processes after its removal from the entire display. However, the glass panels that are present in LCD and plasma displays must first be removed from display. This specification does not describe a a method for removing the hazardous materials from the LCD.

The invention is therefore directed towards providing an improved method for removal of hazardous materials from LCD displays.

SUMMARY OF THE INVENTION

According to the invention, there is provided a process for treating an LCD display to remove hazardous substances, the process comprising the steps of:
  making incisions in a front part of a frame of the display at incision lines which extend around a front panel,
  removing components to expose fluorescent tubes, and
  crushing the fluorescent tubes in situ and removing by suction particles and gases arising from the tube crushing.

In another aspect the invention provides a system for removing hazardous substances from LCD displays, the system comprising means for making incisions in a front part of a frame of the display at incision lines which extend around a front panel, means for removing components to expose fluorescent tubes, and means for crushing the fluorescent tubes in situ, and an extraction system for removing by suction particles and gases arising from the tube crushing.

In one embodiment, the incisions are parallel to recessed lips bordering the frame and the front panel. In one embodiment, the incisions are at a distance in the range of 0 to 30 mm from the recessed lips and preferably the distance is in the range of 10 mm to 20 mm and preferably the incisions are to a depth of 20 mm to 50 mm from a top surface of the frame. Preferably, at least two incisions are made simultaneously.

In one embodiment, a vision system guides blade location. Preferably, translational movement of a probe or sensor guides the location of an incision tool. In one embodiment, a datum block guides the location of an incision tool.

In one embodiment, a roller is used for crushing. In another embodiment, reciprocating plates are used for crushing. In one embodiment, rotating members are used for crushing. In one embodiment, brushes are used for crushing.

In one embodiment, the LCD display is conveyed during at least some of the process on a carrier pallet. Preferably, the carrier pallet comprises a shape-memory base to accommodate different configurations of LCD display. In one embodiment, the carrier pallet comprises a piston to grip the LCD display. In one embodiment, the LCD display is conveyed upside-down on a datum block during at least some parts of the process, and preferably the crushing is performed over an extraction funnel.

In one embodiment, the crushing is performed with an air blower blowing particles and gases towards an extraction duct.

In one embodiment, remaining components after treatment of the tubes, are treated by crushing and recycling. In one embodiment, shred and magnetic extraction of remaining ferrous metal is performed.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Overview

Figure 1:
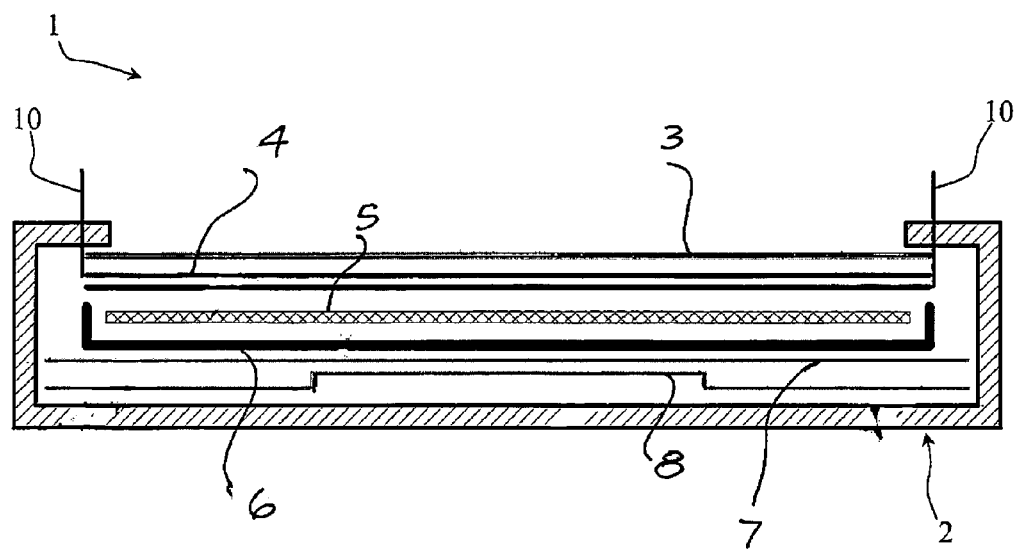
FIG. 1 is a diagrammatic cross-sectional plan long-side view of an LCD, showing incision locations for the process of the invention.
Figure 2:
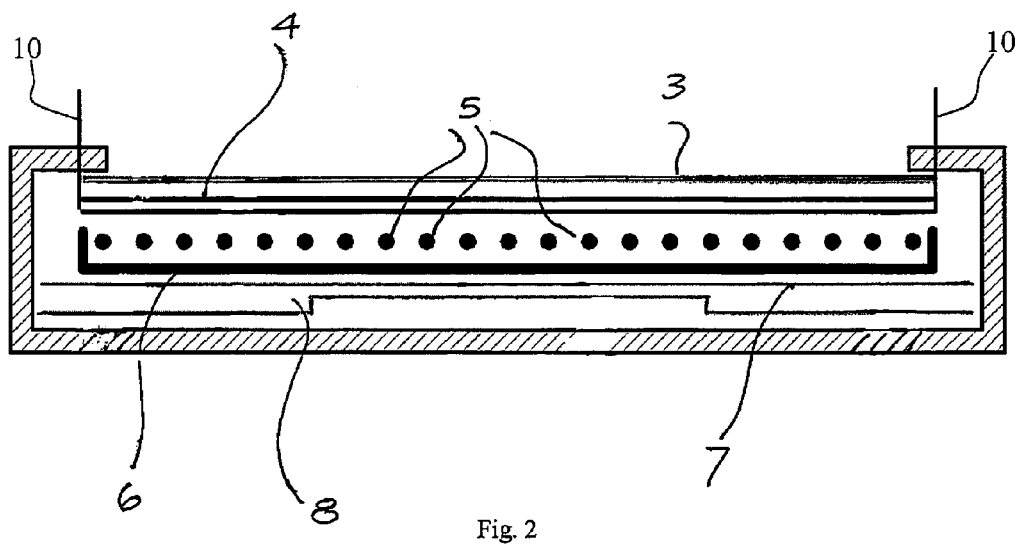
FIG. 2 is a cross-sectional short-side view also showing cut locations.

Referring to FIGS. 1 to 5 an LCD 1 has a frame 2, a liquid crystal panel 3, a Perspex layer 4, cold cathode backlighting fluorescent tubes 5 (containing mercury), a rear enclosure shell 6, a PCB mounting frame 7, and circuits 8 on a PCB. FIG. 1 displays a cross sectional view through the long side of an LCD display where the fluorescent tubes 5 are parallel to the edge of the LCD. FIG. 2 displays a cross sectional view through the short side of the LCD display 1 where the fluorescent tubes 5 are perpendicular to the edge.

Figure 6:
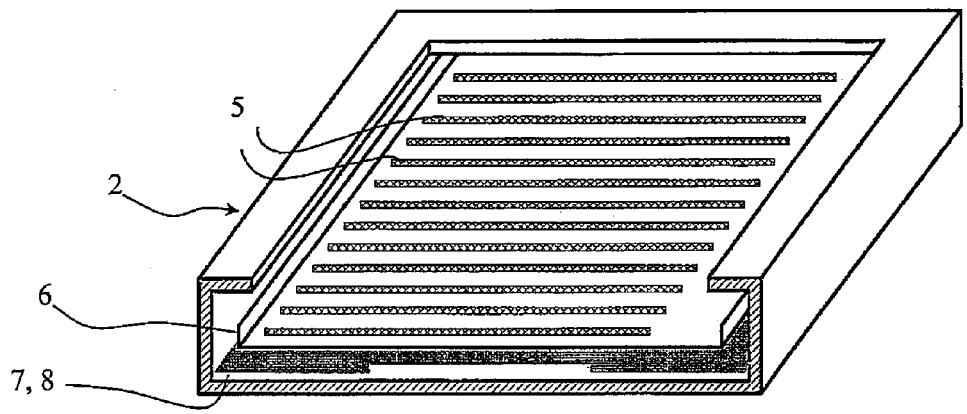
FIG. 6 shows the display after removal of front components after incision to expose the fluorescent tubes.
Figure 7:
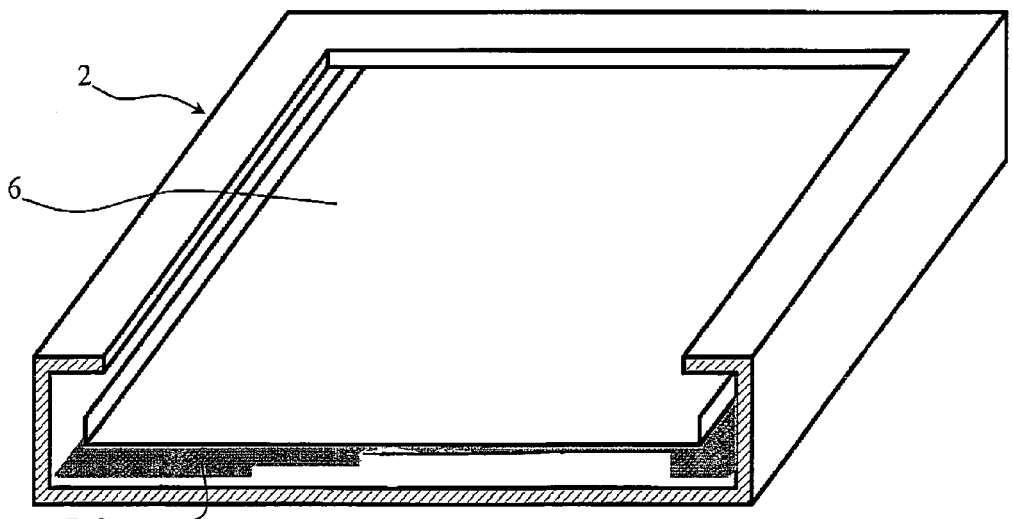
FIG. 7 shows the remaining components after crushing of the tubes and suction of particles and gases.

In the process the mercury-containing tubes 5 and the liquid crystal panel 3 are completely removed initially and they are treated according to standards such as the European WEEE directive. This exposes the fluorescent tubes 5 as shown in FIG. 6. The tubes 5 are then crushed in situ with particle and gas extraction in a closed environment so that hazardous substances are comprehensively removed. The remaining components as shown in FIG. 7 such as the frame are then processed in a conventional manner.

The process provides a quantifiable account for the amount of hazardous substances removed from the LCD, so that a check can be made that this value is in line with that expected per unit/display. This establishes that all of the mercury has been removed from the LCD and that the threat to the environment has effectively been removed. Techniques such as atomic fluorescence spectroscopy and atomic absorption spectroscopy are used to analyse the filters of the vacuum extraction system to establish the quantities of the various components.

Figure 3:
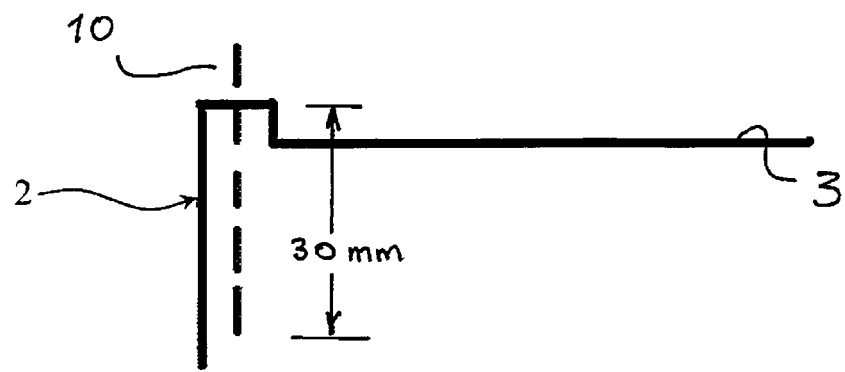
FIG. 3 is a diagram showing in more detail incision locations for a first step of the process.
Figure 3:
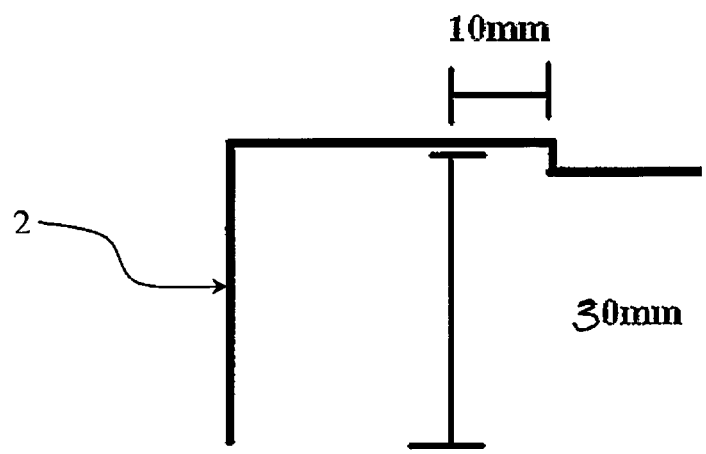
Figure 4:
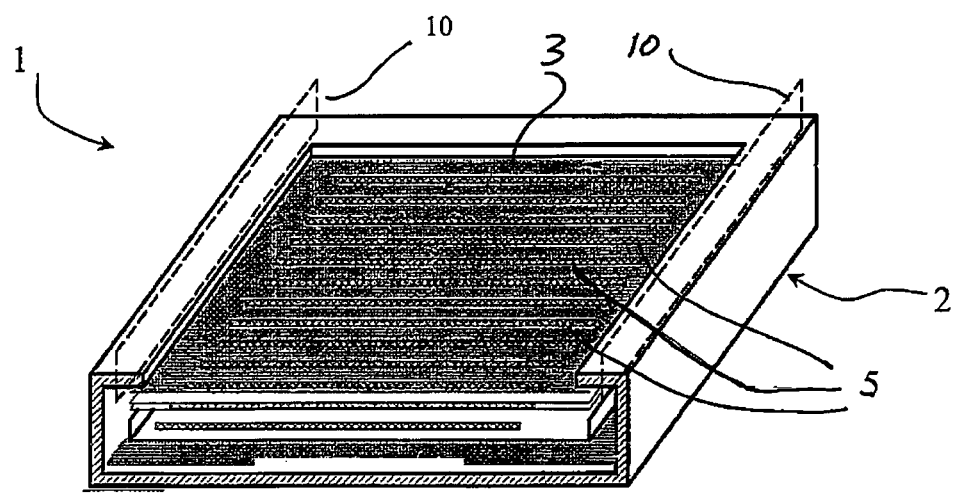
FIG. 4 shows a first two simultaneous incisions.
Figure 5:
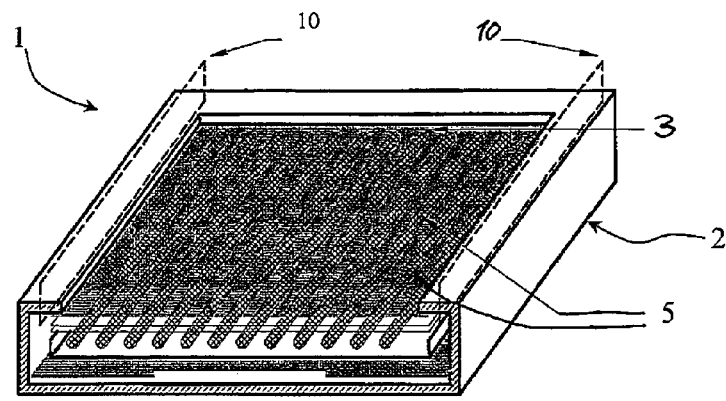
FIG. 5 shows a further two simultaneous incisions.

The process includes an early step of excising a specific portion of the front of the display 1 by making an incision at a distance in the range of 0 to 30 mm and most preferably 10 mm to 20 mm from the recessed edges of the frame 2 and liquid crystal panel 3 and to a depth of 20 mm to 50 mm from the top surface of the frame 2. The four incision lines 10 are shown in FIGS. 1 to 3. These steps are illustrated in FIGS. 5 and 6. The incision location is specifically chosen not to disassemble the LCD but to allow the LCD to remain intact while excising a portion of the front of the display. The cut material is removed and the CCFT tubes 5 at the rear of the display are exposed.

The process also includes crushing of the exposed fluorescent tubes using a roller (FIGS. 13 and 14), crusher plates (FIG. 15), rotating chains (FIG. 16), or rotating nylon device. The crushed debris consisting of a mixture of glass, mercury and fluorescent powders is evacuated out of the system under pressure and glass, mercury, and powders are separated using a filtering system. It is important that the LCD display structure remains intact after the incision process step to support the crush operation of the fluorescent tubes as a considerable force is applied to the display during the latter step. Hence the incision location is very advantageous. Studies have shown that incision at a location within the location range in either the X/Y direction or in depth results in gaining direct access to the mercury containing tubes with the enclosure shell remaining intact and where the tubes 5 can subsequently be completely removed. Incision at a location under the range specified in either X/Y direction or in depth results in destruction of the glass panel, and/or premature breaking of the CCFT tubes 5. Incision at a location outside the range specified in either X/Y direction or in depth results in destruction of the LCD structure, making the subsequent tube removal impossible. A shallow incision results in insufficient material removal to expose the CCFT tubes 5.

Early removal of the hazardous substances while allowing the remainder of the LCD to stay intact has many benefits. As the LCDs are still intact they are easy to transport and move for further processing steps. Shredding is now a viable option as the hazardous substances are removed and indeed the process of the invention can be employed as a pre-processing step for a large scale shredding operation of the remaining components.

By removing the entire CCFT tubes 5, not only is the requirements of the WEEE directive met but also the hazardous substances such as fluorescent powders present as coatings in the tubes are removed, resulting in an added benefit to the environment.

The process is carried out in a sealed unit and is automated to the extent that it does not require manual interaction. The crush operation is performed under vacuum and all hazardous substances including mercury vapour are immediately removed, thereby preventing exposure to workers at recycling facilities or any contaminants entering the atmosphere. The hazardous substances are safely separated and stored in a suitable sealed container. The materials collected are fully malleable and available for quantitative and qualitative analysis as necessary using standardised techniques such as X-ray fluorescence (XRF) or energy dispersive X-ray analysis (EDAX), atomic fluorescence spectroscopy (AFS) and atomic absorption spectroscopy (AAS).

The incision operation is compatible with all types and variations of LCD displays regardless of size and make. The fluorescent tubes 5 are removed and are crushed using a roller, chain or series of plates, which drives forward crushing the tubes. An integrated vacuum system sucks up the crushed glass and mercury, which is now segregated in appropriate containers.

Having removed the hazardous materials the LCD is now ready for further processing which can incorporate for example manual separation—unscrewing, shredding or cyclonic destruction and sorting, compression of the LCD displays using a hydraulic press, to effectively pop the remaining components apart. The method chosen will be determined by the requirements of the individual recycler and the degree of disassembly required.

Incision Operations (FIGS. 1 to 5 and 8 to 12)

Figure 8:
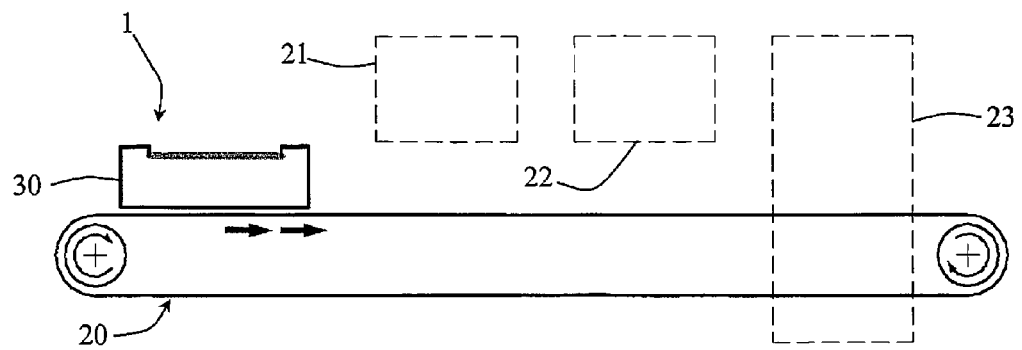
FIG. 8 is a side view showing a conveying arrangement for incision.
Figure 9:
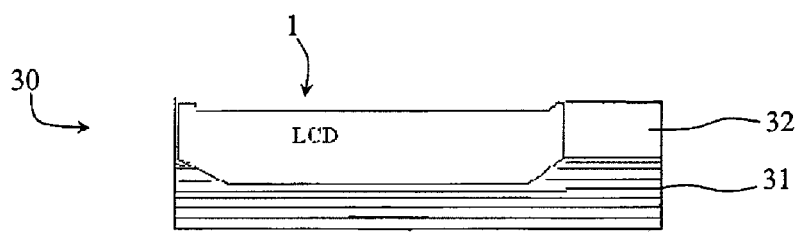
FIG. 9 is a diagrammatic side view of a carrier pallet for an LCD display.
Figure 10:
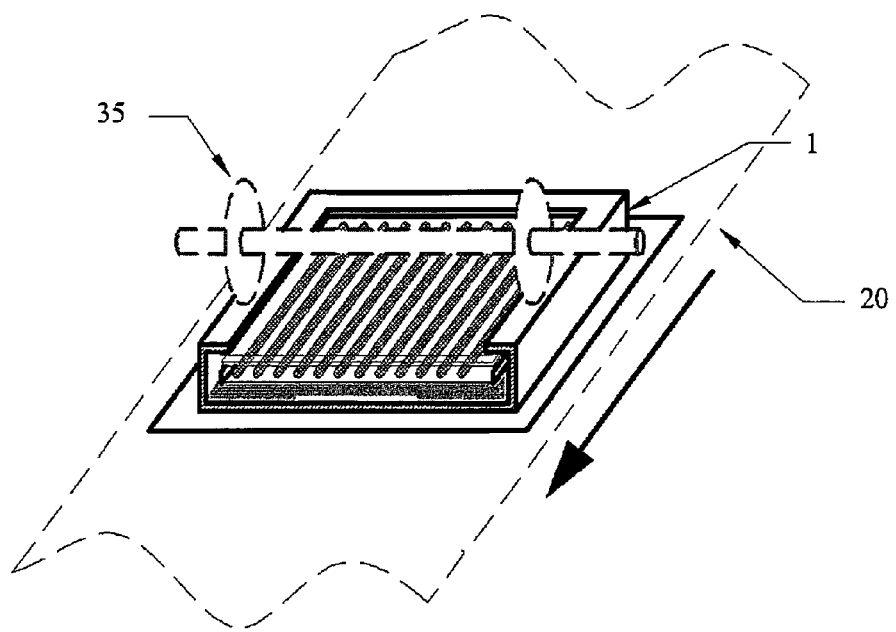
FIG. 10 is a diagrammatic perspective view of incision along two sides.
Figure 11:
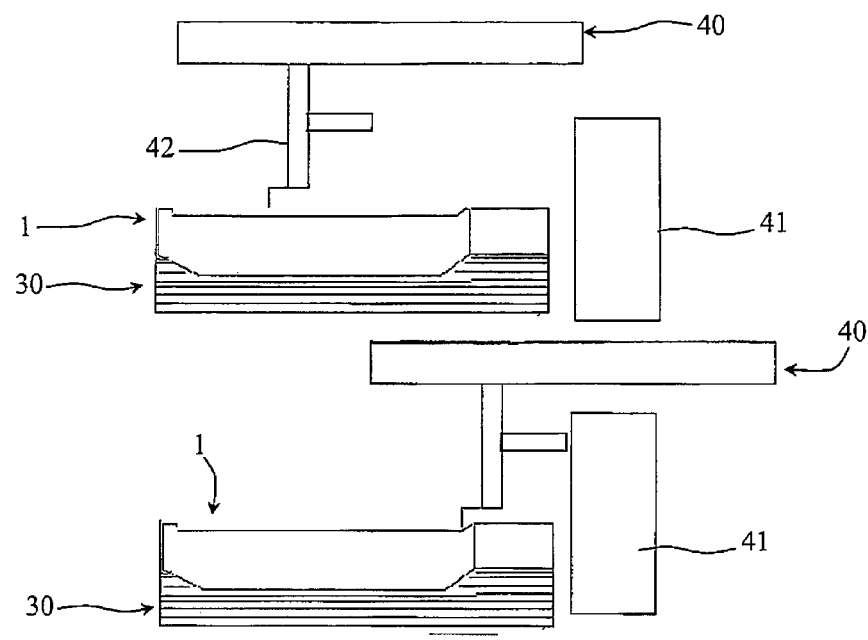
FIG. 11 is a pair of diagrams showing a positioning device which accurately positions the LCD for incision.

Referring to FIG. 8 a conveyor 20 conveys an LCD display 1 in a carrier 30 in the up-right position (LCD facing upwards) through first and second incision stations 21 and 22 and a crush station 23 in a sealed chamber with vacuum extraction. As shown in FIG. 9 the carrier 30 has a shape memory foam 31 underneath and a piston 32 for secure gripping of the display 1. FIG. 10 shows operation of parallel cutting blades 35 for the first cutting operation. The blades are in the orthogonal direction for the second cutting operation at the station 22. FIG. 11 shows a gripper unit 40 with a gripper arm 42 engaging the recessed edge of the display 1 and sliding the entire LCD to a location determined by the hard stop 41, which is aligned with the incising blades to achieve the accurate positioning of the LCD for the subsequent incision operation.

Figure 12:
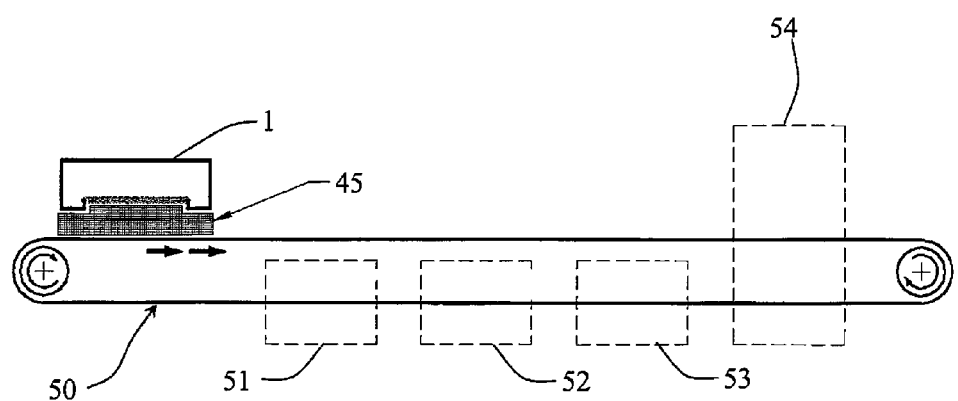
FIG. 12 is a side view of an alternative conveying arrangement showing incision and crushing from underneath.
Figure 16:
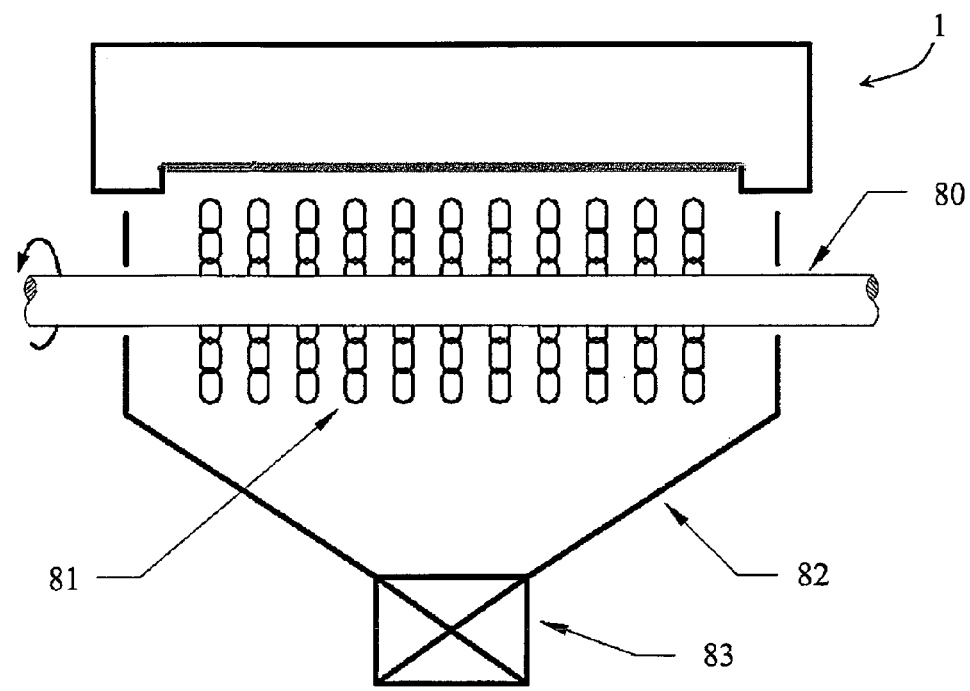
FIG. 16 is a front view showing crushing with rotating chains.

An alternative embodiment is shown in FIG. 12, in which LCDs are loaded on to a datum block manually. Datum blocks are available in all display sizes and the block fits inside the recessed edge of the LCD display. The datum block will transport the LCD in the up-side down position (i.e. LCD facing down) through the process. The datum block can be moved using a conveyer or chain conveyer system. The datum block position is automatically aligned with the fixed cutting blades, guaranteeing the cut in the correct location of the LCD which is positioned on top of the block. The LCD on the datum block enters the system on a conveyor 50 which allows access from underneath for first and second incision stations 51 and 52. After the incisions are made the LCD is lifted up using mechanical arms at a station 53 and the datum block with the incised materials are left by gravity sitting in the conveyor. The datum block and incised materials can then be manually or automatically removed from the process. The LCD held by the mechanical arms is then transferred to the crush station 54, where rotating chains are spin on a shaft and break the tubes in the LCD against the enclosure panel. All debris falls due to gravity and is captured in the extraction system located below as can be seen in FIG. 16.

A series of automated incisions are precisely positioned, which allows the direct removal of a specific portion of the front of the LCD display. The location of the incision position is critical to the process. Our research has identified two consistencies in LCD displays of different manufacturers and models. These are the presence of a recessed lip, where glass meets top cover and the size of the glass screen. A series of four incisions parallel to the recessed lip of the LCD and off-set 15 mm (working range of 0-30 mm) distance from this recessed lip at a depth range of 20-50 mm, allows removal of the severed material and immediate exposure of the fluorescent tubes. This offers the potential to automate an incision and material removal cell, where the LCD will be positioned and incised automatically, regardless of size or variation. After the incision process the severed material can be immediately removed and the CCFL tubes 5 are then exposed.

Trials of the process were carried out, to investigate effectiveness of the incision location and depth. The LCD displays were clamped down on to a bench. The LCD incision locations were measured from the recessed lip and marked on the surface of the LCD. A hand operated circular saw was used in the experiments, with a multi-purpose TCT blade, 185 mm diameter, 3500 RPM and blade movement of approximately 16-19.3 mm/sec (hand movement rate). Experiments revealed that a deep incision of 50 mm offset from the recessed edge and through the front of the LCD display frame can thus expose the entire tube for crushing.

The LCD unit will be positioned automatically to line up with the incision blades, ensuring the desired incision locations. The LCD recessed lip is the reference point and the incision blades are off set typically by 15 mm from this point.

One such system consists of an X/Y movement table where a positioning arm is driven down from above to a set distance e.g. 5 mm from the glass surface (FIG. 11). When the surface is detected the gripper unit 40 will move in the x direction until the gripper grabs the raised ledge of the lip. The gripper arm 42 slides the LCD across the shuttle until a hard stop is reached. This hard stop is positioned in line with blades to achieve accurate incision locations in the LCD. Pneumatic clamps secure LCD unit.

Alternatively, lip detection can be achieved using laser displacement sensor (scanning), a proximity sensor, a contact sensor, or resistance or capacitance touch sensors. Vision systems and X-ray vision may also be employed to detect the lip of the LCD. Machine vision systems using digital cameras, smart cameras, and image processing software may be used to perform lip detection.

The lip location (as determined by one of the above sensors) is then fed to a mechanical positioning system, which adjusts the LCD unit on the shuttle to line up with the blades. The LCD unit is now clamped in place on the shuttle and ready for the incision operation. Height positioning can also be under taken at this point also if not previously done.

One embodiment of the incision operation involves two parallel blades which are located on a station overhead a shuttle system (FIG. 10). One blade is fixed in position and does not move. The second blade is adjustable to cater for the changing LCD sizes. As the LCD unit on the shuttle enters the incision station, it is continuously fed through the blades and then emerges at the other side. The blades can move in the Z-direction and can engage with the LCD at the required time in the process to achieve the correction incision pattern on the front of the LCD. The movement of the LCD unit on the shuttle changes directions and enters the second positioning system, where it is positioned again for the next incision operation. The LCD unit is now fed under the second set of blades and emerges on the opposite side of the blades. The movement of the LCD unit on the shuttle changes directions and now moves towards the crushing station. Before reaching the crushing station, the severed material must be removed manually or by an automated process (e.g. suction cups or mechanical grippers).

Another embodiment of the incision operation involves two parallel blades which are located on a station underneath the conveyer system (FIG. 12). One blade is fixed in position and does not move. The second blade is adjustable to cater for the changing LCD sizes. With this method the LCD is loaded in to a datum block which is automatically aligned with the incision blades to achieve the correct incision location. As the LCD unit on the datum block enters the station, it is continuously fed through the blades and then emerges at the other side. The blades can move in the Z-direction and can engage with the LCD at the required time in the process to achieve the correction incision pattern on the front of the LCD. The movement of the LCD/datum block on the conveyer changes direction and aligns for the second incision operation. The LCD unit is now fed over the second set of blades and emerges on the opposite side of the blades. Before reaching the crushing station, the severed material must be removed and this is achieved by lifting the LCD using mechanical aims. The severed material and the datum block remain on the conveyor due to gravity and can now be removed form the system. The LCD held by the mechanical arms is now transferred to the crush station.

Crushing Operation (FIGS. 6-7 and 13-16)

Figure 13:
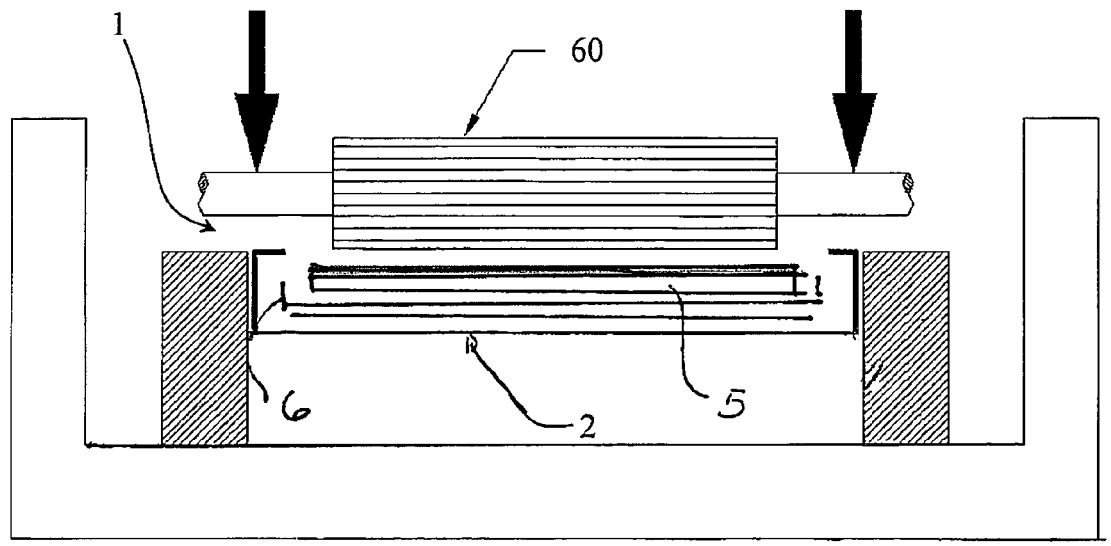
FIGS. 13 and 14 are front and side views showing tube crushing in which a roller is used.
Figure 14:
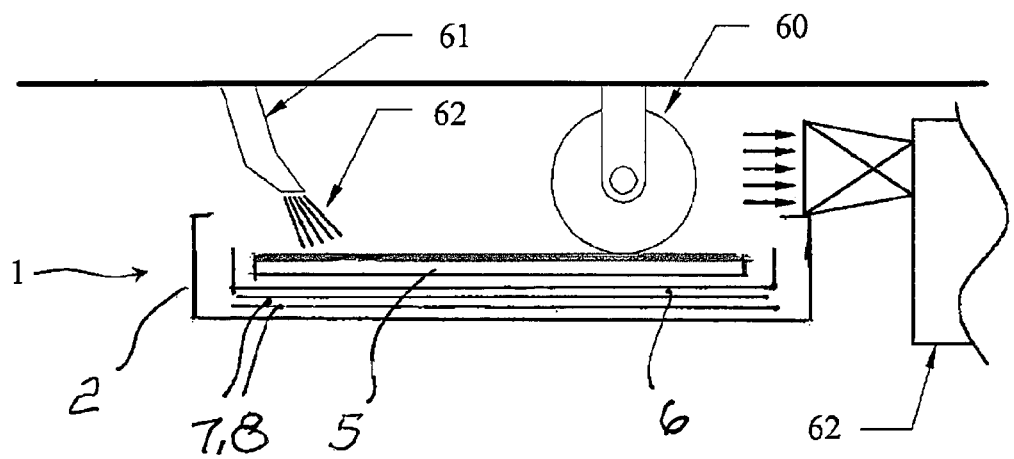
Figure 15:
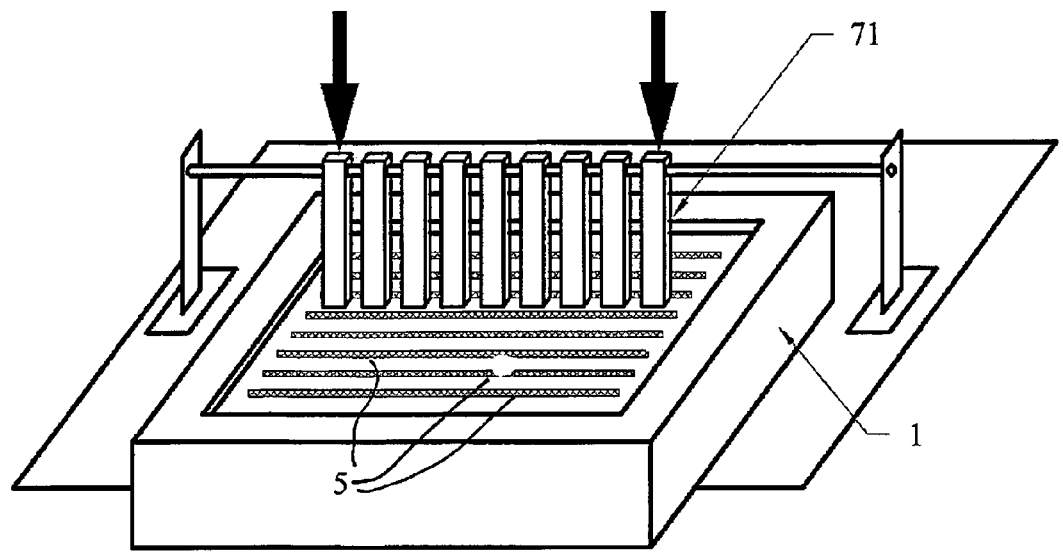
FIG. 15 is a perspective view showing tube crushing with plates.

It has been found that in practice a high proportion of LCDs have broken tubes 5 when opened. Thus, in an effort to contain the tubes, the process includes crushing and sucking the tube material to ensure that all traces of contaminants are removed. As shown in FIG. 6 there is full access to the tubes 5 after the incision and material removal steps. FIG. 13 shows an arrangement for crushing, in which a roller 60 moves downwardly in a stroke to crush the tubes in situ in the enclosures 6 and 2. As shown in FIG. 14 there is an air knife blower 61 preceding crushing and a vacuum extractor 62 downstream of the crusher 60. FIG. 15 shows an alternative arrangement, in which plates 71 apply a downward force on the tubes 5 in the enclosure shell 6. Referring to FIG. 16, another embodiment of the crush operation involves chains 81 mounted on a rotating shaft 80 which spins in the vicinity of the fluorescent tubes 5, extending the chains to make contact with the tubes 5 breaking them into small pieces. The debris falls due to gravity into the funnel located underneath which is attached to the extraction unit.

The crush operation can be preformed with the LCD in the upright position or in the upside down position. FIGS. 13 to 15 show tube crushing in the upright position. In the embodiment of FIGS. 13 and 14 a roller is pushed across the open face of the LCD, crushing the tubes with inside. This roller is on a mechanical arm with X and Z movement so that it can apply a downward force and move across the surface of the enclosure shell, and crush the tubes. After the operation the roller will return to its 'home location' which is away from the LCD so as to not interfere with the rest of the operation. Next, the air knife 61 creates an air stream which drives all the crushed material to one side of the enclosure shell 6. At this point the material is extracted from the LCD by a cylindrical funnel which is attached to the vacuum extractor 62.

FIG. 16 shows the LCD in the upside down position. The rotating shaft 80 fitted with chains 81 is located directly below the LCD 1 and is powered by a motor. The shaft is on a moving conveyor which transverses in the X and Y directions. The chains spins at high speed on the shaft and break the tubes in the LCD against the enclosure shell 6. The process is then gravity-assisted as all broken materials and debris fall downwards in to the funnel 83 which is connected to a vacuum extraction system. For all the above alternatives, the crushing operation is performed in a sealed unit.

Figure 17:
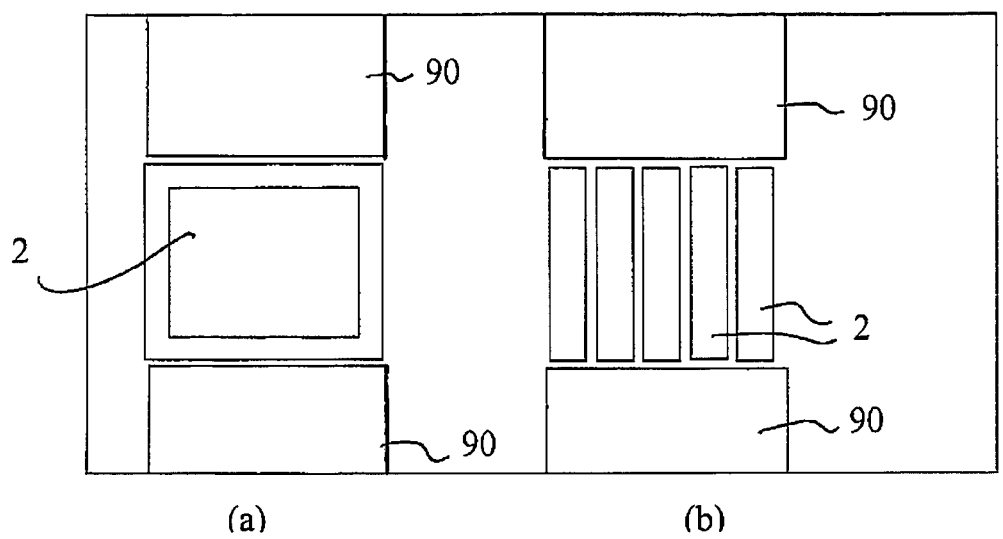
FIG. 17 is a diagram showing crushing of remaining components after removal of the tubes.

In the crush operation the enclosure shell 6 provides the necessary support for the crushing tool to apply pressure on the tubes, and the enclosure shell 6 also acts as a containment area for the hazardous materials prior to their extraction. The incision locations ensure the enclosure shell has remained intact for the crush operation. For extraction and filtering the crushed debris contained in the enclosure shell 6 is transferred towards the vacuum extraction cell either by gravity (FIG. 16) or with the assistance of an air knife (FIGS. 11 13 to 15). Once the debris enters the extraction cell, it passes an industrial grade filtration module for mercury extraction using a method of charcoal absorption for maximum filter life and efficiency. The unit is under total negative air pressure at all critical filtration points to ensure efficient mercury filtration Further Processing (FIGS. 7 and 17)

Having removed the hazardous materials the remaining components are now ready for further processing, which will be determined by the requirement of the recycler. The processes available include manual separation by unscrewing, shredding or cyclonic destruction and sorting process, and compression.

Shredding or Cyclonic Destruction and Sort Processes

As the hazardous substances are now removed from the LCD displays 1, shred (or destructive processes) are now viable as an option to process the remainder of the LCD display. This shred and sort option is essential for large recycling facilities that process large quantities of WEEE. Shredding can be used as an environmentally-friendly process without risk of mercury contamination of the waste streams. Initial processing of the LCD takes approximately 60 seconds. Shredding at this point in the process is a fast and efficient means of processing the remainder of the LCDs with high throughput. The overall process is therefore extremely fast. After LCDs have passed the initial operations, they can now be mixed with general WEEE waste for the shred operation. This significantly increases the efficiency of a recycling plant and allows general WEEE recyclers to break into the LCD recycling market.

Compression Breakdown of the Remainder of the LCD Display

FIG. 17 shows compression breakdown of the remainder of the LCD display. The frames 2 are loaded upright between hydraulic cylinders 90. A number of LCD displays can be stacked side-by-side, depending on the diameter of the hydraulic cylinders. This operation collapses the frame and cover structure of the LCD. As the hazardous substances have been previously removed and the front support provided by the glass panel is also removed, the outer casing and frames will give way, fracturing and exposing the remaining frames and printed circuit boards which are of value. The process hence obtains maximum components from the LCD display in a fast manner.

For LCD handling during the process, FIG. 9 shows a carrier 30, which has a Perspex™ body, and the adjustable piston 32 is used to clamp the LCD 1 in place. The pallet 30 is layered with thick shape memory foam 31, which ensures that the LCD 1 will sit flat in the pallet regardless of the shape of the back cover of the LCD. An alternative clamping mechanism to the adjustable piston is a pallet with two moveable sides which an operator can slide in and clamp to secure the LCD. Toggle clamps may also be used. This pallet 30 rolls on to a shuttle conveyer system. Thus, the bottom of the shuttle and the table where the pallet sits has a bed of roller balls at the same height. Height positioning of the pallet/LCD unit on the shuttle may be adjusted at this point. This shuttle system is required to transport the LCD/pallet in the facing up position though the entire process. The processing tools (eg. Incision blade and crush mechanisms) are all located on stations which over hang the conveyor system from above. FIG. 15 illustrates the incision operation for the pallet conveyor system.

FIG. 12 shows a schematic of a moving block conveyer system to recycle LCDs. LCDs 1 are loaded on to a datum block 45 manually. Datum blocks are available in all display sizes and the block fits inside the recessed lip of the LCD display. The datum block 45 transports the LCD in the up-side down position (i.e. LCD facing down) through the process. The datum block 45 can be moved using a conveyer or chain conveyer system, and it is automatically aligned with fixed blades, guaranteeing that the incision in the correct location of the LCD which is positioned on top of the block.

After the two incision operations are performed, a pair of parallel mechanical arms move in under the sides of the LCD 1 and lift the LCD upwards and incised materials are left behind on the conveyor by the weight of gravity and are conveyed to a storage location. For the crush operation the LCD is now carried by a mechanical arm over the rotating shaft where chains break the tubes against the enclosure shell and the debris is extracted from the system.

The invention achieves the advantages of removal of hazardous substances in an environmentally-friendly process and with versatility as the process can handle any type of LCD regardless of size, make, model or shape. The problem of unscrewing between about 70 and 100 screws which are contained in the LCD is circumvented. The removal of hazardous substances allows the possibility of a downstream shred process for large scale operations. As typically more than 51% of remaining material is ferrous metal magnetic separation is viable.

The issues of broken fluorescent tubes before processing is effectively dealt with because the frames 6 and 2 are used to support the crushing. The processes meet the requirements of the WEEE directive, by removing the hazardous substances, and can achieve 75% weight recovery of materials. The three-step process allows three LCDs to be in the process at once, tripling throughput.

As many components within the LCD possess significant value as uncontaminated waste streams, this recycling process ensures the safe recovery of these components. For example, the downstream processes can recover PCB boards, plastics and steel metal frames, which have a significant value.

The invention is not limited to the embodiments described but may be varied in construction and detail. For example, any of the following are used for the incising operation: a blade, a bandsaw, a circular saw, a cutting tool, a diamond blade, a diamond tool, a file, a glass cutter, a hacksaw, a handsaw, a knife, a laser cutter, a milling cutter, a plasma cutter, a saw, a scalpel, a shears, a switchblade, tool bits, turning tools for lathes, and/or a water jet cutter. Also, it is envisaged that the incision operations may be performed under vacuum. Also, still brushes may be used to crush the tubes.

The invention claimed is:

1. A process for treating an LCD display to remove hazardous substances, the process comprising the steps of:
   making incisions in a front side of a liquid crystal display comprising a frame, fluorescent tubes, and a front panel;
   excising a portion of the front side of the display to expose the fluorescent tubes, and
   breaking the fluorescent tubes in situ and removing the broken fluorescent tubes.

2. A process as claimed in claim 1, wherein the frame and the front panel are bordered by recessed lips and the incisions are parallel to the recessed lips.

3. A process as claimed in claim 2, wherein the incisions are at a distance in the range of 0 to 30 mm from the recessed lips.

4. A process as claimed in claim 3, wherein the distance is in the range of 10 mm to 20 mm.

5. A process as claimed in claim 1, wherein the incisions are at a depth of 20 mm to 50 mm from a top surface of the frame.

6. A process as claimed in claim 1, wherein at least two of the incisions are made simultaneously.

7. A process as claimed in claim 1, wherein the display is turned upside-down to remove the broken fluorescent tubes.

8. A process as claimed in claim 1, wherein the fluorescent tubes are removed in a negative air pressure environment.

9. A process as claimed in claim 1, wherein the display is shredded after the fluorescent tubes have been removed.

10. A system for removing hazardous substances from an LCD display, the system comprising:
    an incising tool to make incisions in a front side of a liquid crystal display comprising a frame, fluorescent tubes, and front panel, and to remove part of the front side of the display to expose the fluorescent tubes;
    a crushing tool to break the fluorescent tubes, in situ; and
    an extraction system to remove by suction, particles and gases from the broken fluorescent tubes.

11. A system according to claim 10, further comprising:
    a conveyor to transport the display.

12. A system according to claim 11, further comprising:
    a carrier to transport the display on the conveyor.

13. A system according to claim 10, further comprising:
    a removal tool to separate the front side of the display from a remainder of the display to expose the fluorescent tubes.

14. A system according to claim 13, wherein the removal tool comprises at least one of suction cups, a mechanical gripper, and mechanical arms.

15. A system according to claim 10, wherein the incising tool, crushing tool, and extracting system are contained within a sealed unit.

16. A system according to claim 10, further comprising:
a recycler to process the display via a shred and sort system after removal of the fluorescent tubes.

17. A system according to claim 10, further comprising:
a lip detector to detect positions of recessed lips that border the frame and the front panel of the display and to guide the incising tool when making the incisions at the recessed lips.

18. A system according to claim 17, wherein the lip detector comprises at least one of a sensor and a machine vision system.

19. A system according to claim 17, wherein the incising tool makes the incisions at a location measured from the detected positions of the recessed lips.

20. A method for recycling LCD displays, comprising:
making at least one incision in a front side of a liquid crystal display to define at least one excisable portion in the front side of the display, wherein the liquid crystal display comprises fluorescent tubes;
excising the at least one excisable portion of the display and exposing the fluorescent tubes; and
removing the fluorescent tubes from the display.

\* \* \* \* \*